US006674052B1

(12) United States Patent
Luo

(10) Patent No.: US 6,674,052 B1
(45) Date of Patent: Jan. 6, 2004

(54) THERMAL CUP

(76) Inventor: Chin-Kuang Luo, 5F, No. 56, Min-Chuan Rd., Chung Dist., Taichung City (TW)

( * ) Notice: Subject to any disclaimer, the term of this patent is extended or adjusted under 35 U.S.C. 154(b) by 0 days.

(21) Appl. No.: 10/395,555

(22) Filed: Mar. 24, 2003

(30) Foreign Application Priority Data

Nov. 25, 2002 (TW) ........................................ 91218980 U

(51) Int. Cl.[7] ................................................. H05B 3/06
(52) U.S. Cl. ........................... 219/520; 62/3.2; 392/441; 219/432
(58) Field of Search ................................ 219/520–522, 219/530, 432, 430, 433, 443.1; 392/441, 444, 488; 62/3.2, 3.7, 3.3, 457.9, 457.3, 457.4

(56) References Cited

U.S. PATENT DOCUMENTS 3,715,895 A * 2/1973 Devlin ....................... 62/457.3
4,801,782 A * 1/1989 Ineson ......................... 219/438
5,361,604 A * 11/1994 Pier et al. .................. 62/457.4
5,842,353 A * 12/1998 Kuo-Liang .................... 62/190
6,072,161 A * 6/2000 Stein .......................... 219/432
6,422,024 B1 * 7/2002 Foye ............................ 62/3.2

* cited by examiner

*Primary Examiner*—Sang Y. Paik
*Assistant Examiner*—Thor Campbell
(74) *Attorney, Agent, or Firm*—Trop, Pruner & Hu, P.C.

(57) ABSTRACT

A thermal cup includes a hollow inner cup body having an inner surrounding wall and an outer surrounding wall that confine an enclosed chamber therebetween, and an outer cup body made of a heat insulating material and disposed to surround the outer surrounding wall of the inner cup body. The inner surrounding wall further confines a space for containing liquid therein. The outer cup body cooperates with the outer surrounding wall of the inner cup body to confine a clearance therebetween. A thermal conductor unit is provided on the outer surrounding wall of the inner cup body, and is disposed in the clearance.

21 Claims, 5 Drawing Sheets

THERMAL CUP

CROSS-REFERENCE TO RELATED APPLICATION

This application claims priority of Taiwanese Application No. 091218980, filed on Nov. 25, 2002.

BACKGROUND OF THE INVENTION

1. Field of the Invention

The invention relates to a thermal cup, more particularly to a thermal cup that enables quick and uniform distribution of temperature of liquid contained in the cup.

2. Description of the Related Art

Referring to FIG. 1, a conventional thermal cup 1 is shown to include a cup body 11 having inner and outer walls 112, 111, a vacuum sealed chamber 12 cooperatively confined by the inner and outer walls 112, 111, and a space 13 confined by the inner wall 112 of the cup body 11 for containing liquid therein, and a cap 14 for closing removably an open mouth of the cup body 11.

In use, after a liquid is poured into the space 13 of the cup body 11 and the cap 14 is fitted in place, the vacuum sealed chamber 12 provides a heat-insulating effect to prevent convection between the liquid in the cup body 11 and the ambient air so as to maintain the temperature of the liquid. However, in actual use, the heat-insulating effect is not satisfactory. In addition, the liquid in the upper and lower parts of the space 13 does not have a uniform temperature, which may result in scalding or freezing of the user's tongue during drinking.

SUMMARY OF THE INVENTION

Therefore, the main object of the present invention is to provide a thermal cup that has a thermal conductor unit disposed therein to ensure quick and uniform distribution of temperature of liquid contained in the cup, and that provides a good heat-insulating effect.

Accordingly, a thermal cup of the present invention includes:

- a hollow inner cup body having an open mouth and a closed bottom, the inner cup body including an inner surrounding wall and an outer surrounding wall that confine an enclosed chamber therebetween, the inner surrounding wall further confining a space for containing liquid therein;
- an outer cup body made of a heat insulating material, disposed to surround the outer surrounding wall of the inner cup body, and cooperating with the outer surrounding wall of the inner cup body to confine a clearance therebetween; and
- a thermal conductor unit provided on the outer surrounding wall of the inner cup body and disposed in the clearance.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
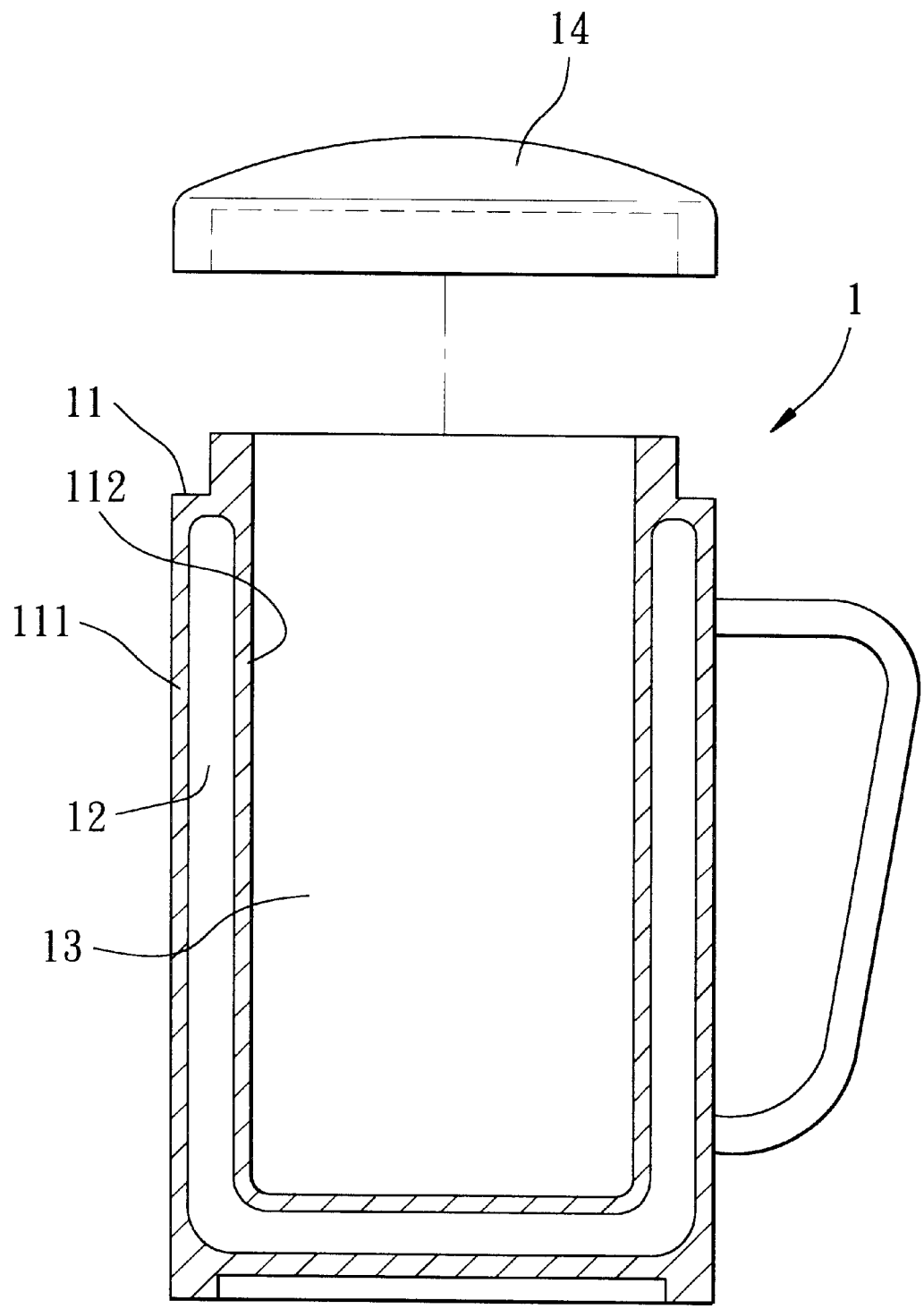
FIG. 1 is a partly exploded sectional view of a conventional thermal cup.

Before the present invention is described in greater detail, it should be noted that like elements are denoted by the same reference numerals throughout the disclosure.

Figure 2:
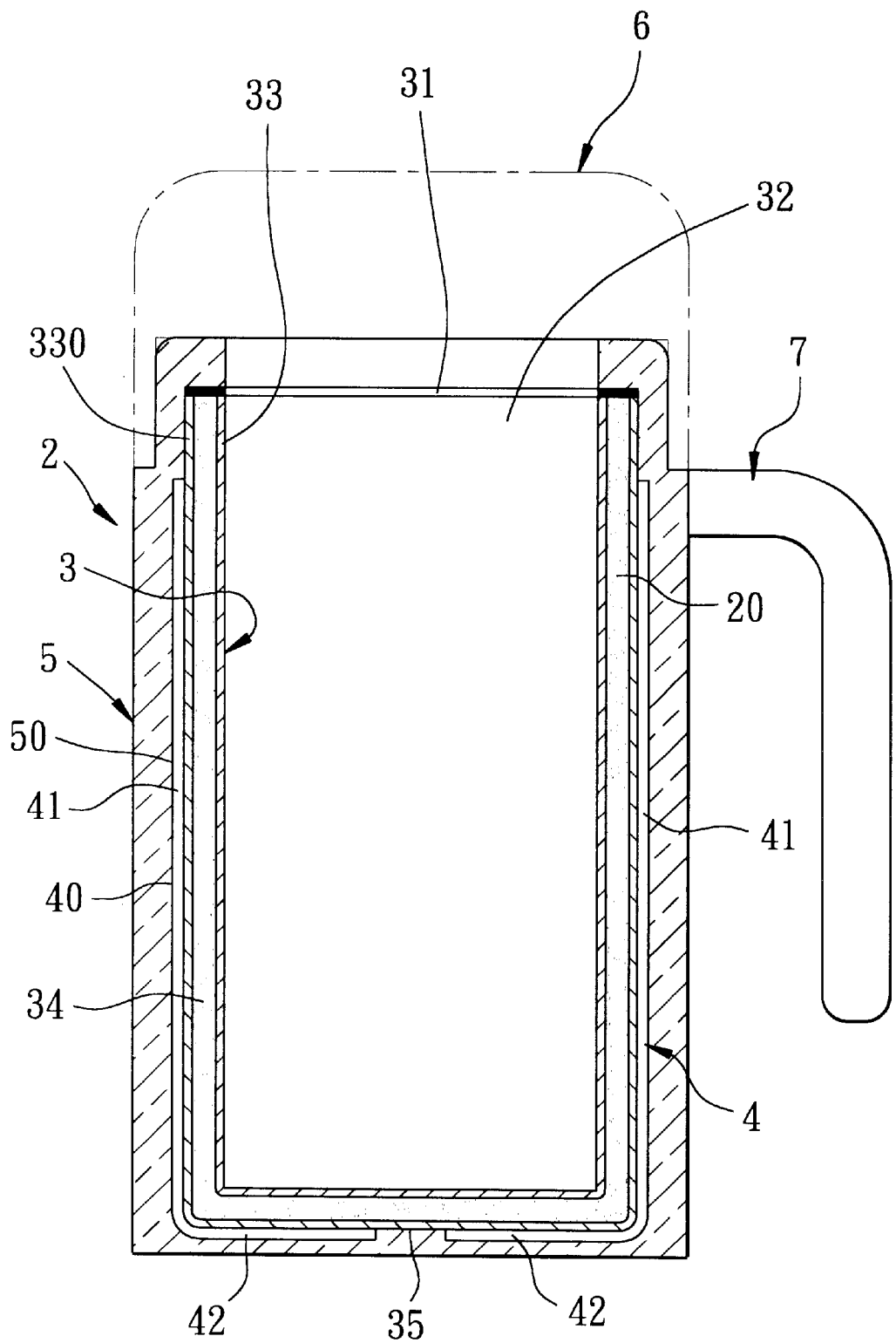
FIG. 2 is a schematic sectional view of the first preferred embodiment of a thermal cup according to the present invention.
Figure 3:
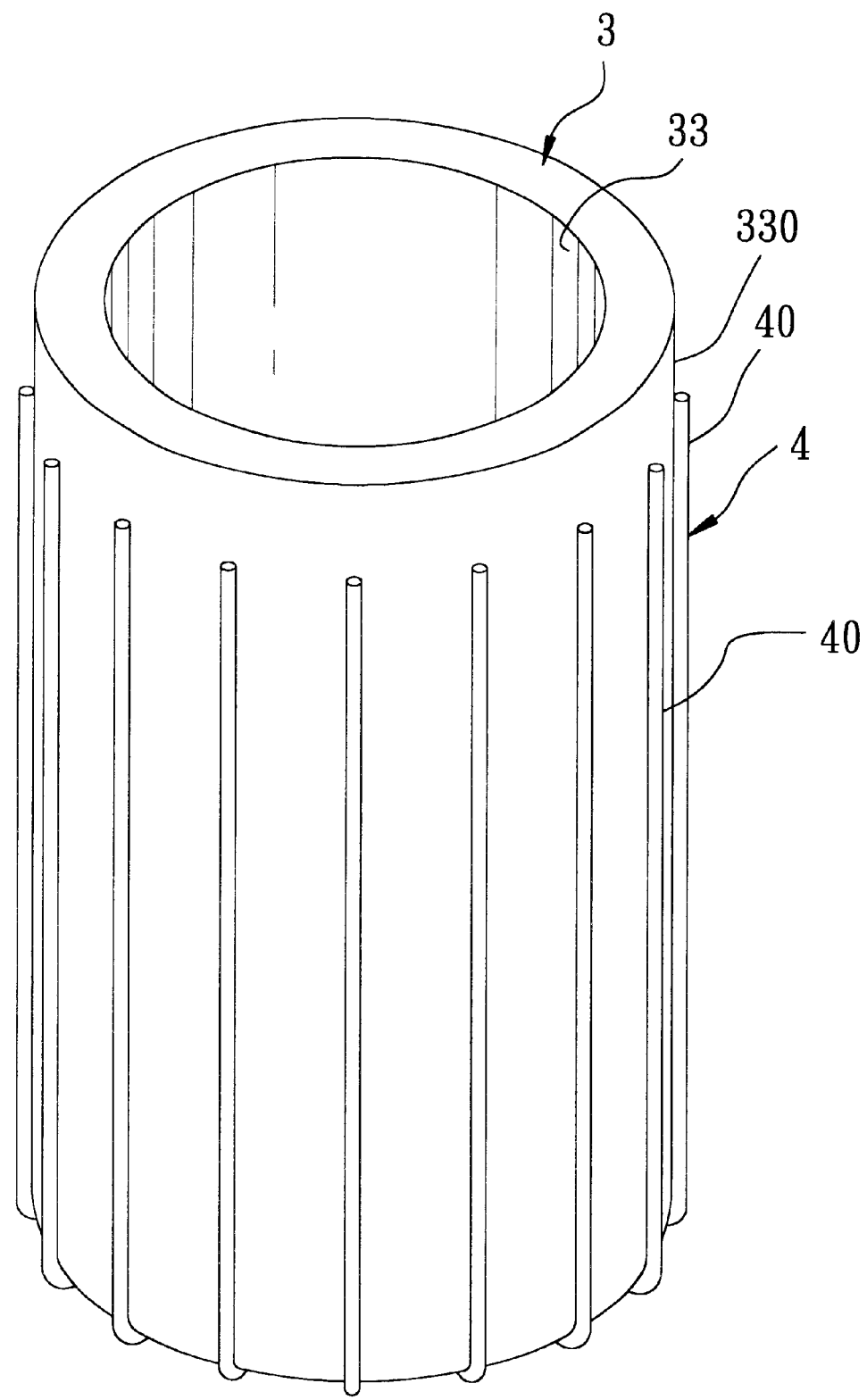
FIG. 3 is a perspective view showing a thermal conductor unit mounted on an inner cup body of the first preferred embodiment.

Referring to FIGS. 2 and 3, the first preferred embodiment of a thermal cup 2 according to the present invention is shown to include a hollow inner cup body 3, an outer cup body 5, and a thermal conductor unit 4.

The inner cup body 3 has an open mouth 31 and a closed bottom 35. A cap 6 is disposed to close removably the open mouth 31 of the inner cup body 3. The inner cup body 3 includes an inner surrounding wall 33 and an outer surrounding wall 330 that cooperatively confine an enclosed chamber 34 therebetween. The inner surrounding wall 33 further confines a space 32 for containing liquid therein.

The outer cup body 5 is made of a heat insulating material, and is disposed to surround the outer surrounding wall 330 of the inner cup body 3. The outer cup body 5 cooperates with the outer surrounding wall 330 of the inner cup body 3 to confine a clearance 50 therebetween. Furthermore, the outer cup body 5 is formed with a handle 7.

The thermal conductor unit 4 is provided on the outer surrounding wall 330 of the inner cup body 3, and is disposed in the clearance 50. The thermal conductor unit 4 includes at least one heat-conducting rod or pipe 40. In this embodiment, the thermal conductor unit 4 includes a plurality of heat-conducting rods or pipes 40, each of which has an upright conducting portion 41 that is attached to the outer surrounding wall 330 of the inner cup body 3, and a horizontal securing portion 42 that extends from the upright conducting portion 41 and that is attached to the closed bottom 35 of the inner cup body 3. It is noted that the thermal conductor unit 4 can be configured to spiral around the outer surrounding wall 330 or have any other geometrical shape. In use, when the user pours a liquid into the space 32, due to the arrangement of the thermal conductor unit 4, the temperature of the liquid can be quickly distributed throughout the space 32. That is, when the thermal cup 2 is used to contain hot or icy cold water, the temperature of the water in the upper and lower halves of the space 32 can be made uniform so that the water will not scald or freeze the user's tongue.

It is noted that the use of superconductor rods can achieve a much faster uniform distribution of the temperature of the liquid in the space 32.

Figure 4:
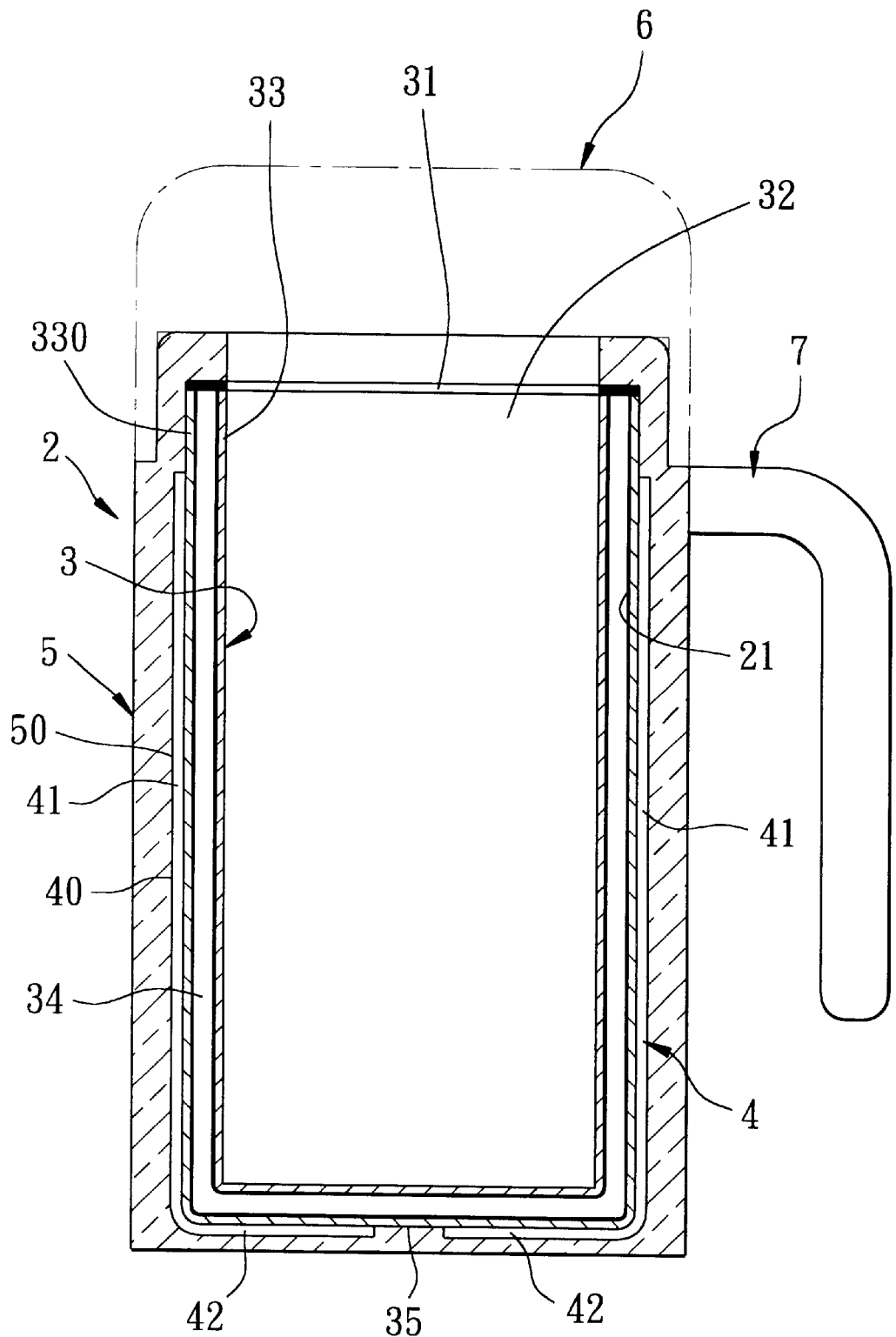
FIG. 4 is a view similar to FIG. 2, but showing a modification of the first preferred embodiment.

Preferably, the enclosed chamber 34 is filled with a heat-conductive material 20 for better heat conduction. Alternatively, each of the inner and outer surrounding walls 33, 330 has a wall surface that confronts the enclosed chamber 34 and that is coated with a heat-conductive lining 21, as shown in FIG. 4. In another alternative, the enclosed chamber 34 is vacuumed to form a sealed vacuum chamber which is filled with a heat-conductive material, such as water, methanol, acetone, ammonia, nitrogen, sodium, lithium, or mixtures thereof, or with a superconductor material. It is noted that the term "filled" as used herein is construed to mean "completely filled" and "partially filled".

Figure 5:
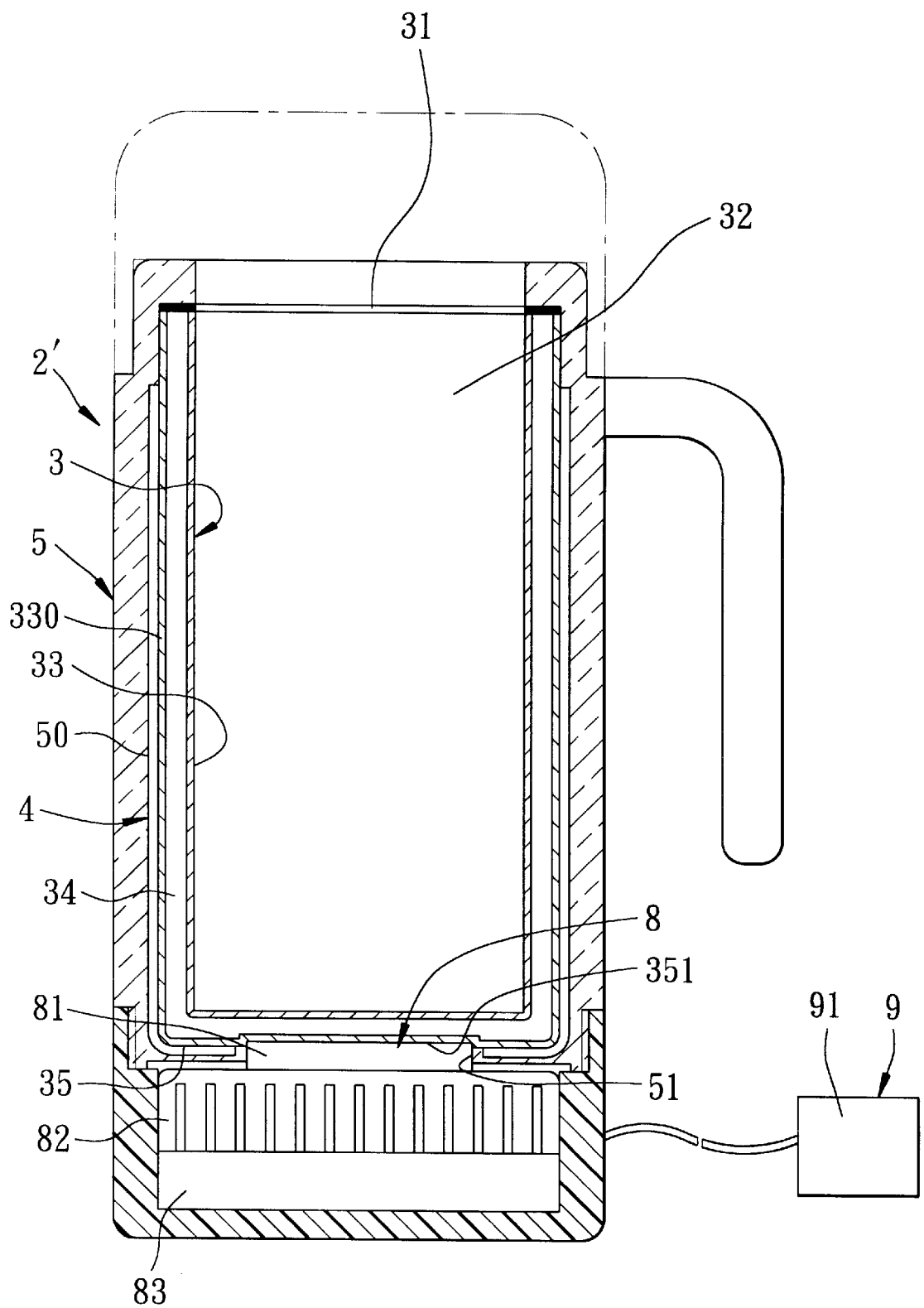
FIG. 5 is a schematic, partly sectional view of the second preferred embodiment of a thermal cup according to the present invention.

FIG. 5 shows the second preferred embodiment of a thermal cup 2' according to the present invention. As shown, the thermal cup 2' includes a hollow inner cup body 3, an outer cup body 5, a thermal conductor unit 4, an electrically operable thermal energy source 8, and a control unit 9.

The inner cup body 3 is made of a heat-conductive material, and has an open mouth 31 and a closed bottom 35. The inner cup body 3 includes an inner surrounding wall 33 and an outer surrounding wall 330 that cooperates with the inner surrounding wall 33 to confine an enclosed chamber 34 therebetween. The inner surrounding wall 33 further confines a space 32 for containing liquid therein.

The outer cup body 5 is made of a heat-conductive material, and is disposed to surround the outer surrounding wall 330 of the inner cup body 3. The outer cup body 5 cooperates with the outer surrounding wall 330 of the inner cup body 3 to confine a clearance 50 therebetween.

The thermal conductor unit 4 is provided on the outer surrounding wall 330 of the inner cup body 3, and is disposed in the clearance 50. Like the previous embodiment, the thermal conductor unit 4 includes at least one heat conducting rod or pipe. In this embodiment, the closed bottom 35 of the inner cup body 3 has a portion 351 free of the thermal conductor unit 4, and the outer cup body 5 has an opening 51 registered with the portion 351 of the closed bottom 35 of the inner cup body 3.

The thermal energy source 8 is disposed removably in the opening 51, and is in thermal contact with the portion 351 of the closed bottom 35 of the inner cup body 3. The thermal energy source 8 may be a ceramics thermoelectric member, an electric heating element, a thermoelectric cooling unit, or the like, which is capable of absorbing or radiating heat energy. In this embodiment, the thermal energy source 8 is a known thermoelectric cooling unit 81. The thermoelectric cooling unit 81 has an upper side to be disposed in thermal contact with the portion 351 of the closed bottom 35 of the inner cup body 3, and a lower side opposite to the upper side and having a heat sink 82 disposed thereon. A fan 83 is disposed below the heat sink 82 to induce air currents toward the heat sink 82.

The control unit 9 is connected electrically to the thermal energy source 8 for controlling activation of the thermal energy source 8. In this embodiment, the control unit is 9 operable so as to enable the thermoelectric cooling unit 81 to operate in a selected one of a heat-absorbing mode, where the thermoelectric cooling unit 81 absorbs heat from the portion 351 of the closed bottom 35 of the inner cup body 3, and a heat-radiating mode, where the thermoelectric cooling unit 81 radiates heat to the portion 351 of the closed bottom 35 of the inner cup body 3.

The control unit 9 includes a temperature control device (not shown) for controlling the thermoelectric cooling unit 81 to operate in one of the aforesaid modes, and a power source 91 connected to the temperature control device.

Due to the provision of the thermal energy source 8 and the control unit 9, the thermal cup 2' of this embodiment can be used for heating or cooling the liquid contained therein. Moreover, the control unit 9 can be configured to be connected to a cigarette lighter in an automobile for the user's convenience.

Like the previous embodiment, the enclosed chamber 34 is preferably filled with a heat-conductive material for better heat conduction. Alternatively, confronting wall surfaces of the inner and outer surrounding walls 33, 330 are coated with a heat-conductive lining for the same purpose.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A thermal cup comprising:
    a hollow inner cup body having an open mouth and a closed bottom, said inner cup body including an inner surrounding wall and an outer surrounding wall that confine an enclosed chamber therebetween, said inner surrounding wall further confining a space for containing liquid therein;
    an outer cup body made of a heat insulating material, disposed to surround said outer surrounding wall of said inner cup body, and cooperating with said outer surrounding wall of said inner cup body to confine a clearance therebetween; and
    a thermal conductor unit provided on said outer surrounding wall of said inner cup body and disposed in said clearance.

2. The thermal cup as claimed in claim 1, wherein said thermal conductor unit extends from said closed bottom toward said open mouth of said inner cup body.

3. The thermal cup as claimed in claim 1, wherein said thermal conductor unit includes at least one heat-conducting rod.

4. The thermal cup as claimed in claim 1, wherein said thermal conductor unit includes at least one heat-conducting pipe.

5. The thermal cup as claimed in claim 1, wherein said enclosed chamber is filled with a heat-conductive material.

6. The thermal cup as claimed in claim 1, wherein each of said inner and outer surrounding walls has a wall surface that confronts said enclosed chamber and that is coated with a heat-conductive lining.

7. The thermal cup as claimed in claim 1, wherein said enclosed chamber is a sealed vacuum chamber.

8. The thermal cup as claimed in claim 7, wherein said enclosed chamber is filled with a heat-conductive material.

9. The thermal cup as claimed in claim 1, wherein said outer cup body is formed with a handle.

10. The thermal cup as claimed in claim 1, further comprising a cap for closing removably said open mouth of said inner cup body.

11. A thermal cup comprising:
    a hollow inner cup body made of a heat-conductive material and having an open mouth and a closed bottom, said inner cup body including an inner surrounding wall and an outer surrounding wall that confine an enclosed chamber therebetween, said inner surrounding wall further confining a space for containing liquid therein;
    an outer cup body made of a heat insulating material, disposed to surround said outer surrounding wall of said inner cup body, and cooperating with said outer surrounding wall of said inner cup body to confine a clearance therebetween;
    a thermal conductor unit provided on said outer surrounding wall of said inner cup body and disposed in said clearance;
    said closed bottom of said inner cup body having a portion free of said thermal conductor unit;
    said outer cup body having an opening registered with said portion of said closed bottom of said inner cup body;

an electrically operable thermal energy source disposed removably in said opening and in thermal contact with said portion of said closed bottom of said inner cup body; and a control unit connected to said thermal energy source for controlling activation of said thermal energy source.

12. The thermal cup as claimed in claim 11, further comprising a heat sink connected to said thermal energy source.

13. The thermal cup as claimed in claim 12, further comprising a fan disposed to induce air currents toward said heat sink.

14. The thermal cup as claimed in claim 11, wherein said thermal energy source includes a thermoelectric cooling unit.

15. The thermal cup as claimed in claim 14, wherein said control unit is operable so as to enable said thermoelectric cooling unit to operate in a selected one of a heat-absorbing mode, where said thermoelectric cooling unit absorbs heat from said portion of said closed bottom of said inner cup body, and a heat-radiating mode, where said thermoelectric cooling unit radiates heat to said portion of said closed bottom of said inner cup body.

16. The thermal cup as claimed in claim 14, wherein said thermoelectric cooling unit has an upper side to be disposed in thermal contact with said portion of said closed bottom of said inner cup body, and a lower side opposite to said upper side and having a heat sink disposed thereon.

17. The thermal cup as claimed in claim 16, further comprising a fan disposed to induce air currents toward said heat sink.

18. The thermal cup as claimed in claim 11, wherein said thermal conductor unit includes at least one heat-conducting rod.

19. The thermal cup as claimed in claim 11, wherein said thermal conductor unit includes at least one heat-conducting pipe.

20. The thermal cup as claimed in claim 11, wherein said enclosed chamber is filled with a heat-conductive material.

21. The thermal cup as claimed in claim 11, wherein each of said inner and outer surrounding walls has a wall surface that confronts said enclosed chamber and that is coated with a heat-conductive lining.

* * * * *